United States Patent
Bennett et al.

(10) Patent No.: US 6,792,494 B2
(45) Date of Patent: Sep. 14, 2004

(54) APPARATUS AND METHOD FOR PARALLEL AND SERIAL PCI HOT PLUG SIGNALS

(75) Inventors: Joseph A. Bennett, Roseville, CA (US); David Sastry, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 520 days.

(21) Appl. No.: 09/821,086

(22) Filed: Mar. 30, 2001

(65) Prior Publication Data

US 2002/0144043 A1 Oct. 3, 2002

(51) Int. Cl.$^7$ ................................................. H05K 7/10
(52) U.S. Cl. ....................... 710/302; 710/300; 710/306; 710/315; 710/316; 710/71; 710/51; 370/535
(58) Field of Search ........................... 710/100, 300, 710/302, 301, 306, 311, 313, 315, 316, 2, 21, 71, 72, 73, 51; 370/535; 341/100, 59

(56) References Cited

U.S. PATENT DOCUMENTS

| | | | | |
|---|---|---|---|---|
| 3,885,167 A | * | 5/1975 | Berglund | 377/57 |
| 4,023,144 A | * | 5/1977 | Koenig | 710/71 |
| 4,124,889 A | * | 11/1978 | Kaufman et al. | 710/2 |
| 4,371,932 A | * | 2/1983 | Dinwiddie et al. | 710/21 |
| 4,680,759 A | * | 7/1987 | Miller et al. | 370/535 |
| 4,728,930 A | * | 3/1988 | Grote et al. | 341/101 |
| 4,885,583 A | * | 12/1989 | McCambridge | 341/100 |
| 5,055,842 A | * | 10/1991 | Mueller | 341/100 |
| 5,134,702 A | * | 7/1992 | Charych et al. | 710/71 |
| 5,421,006 A | * | 5/1995 | Jablon et al. | 714/36 |
| 5,854,840 A | * | 12/1998 | Cannella, Jr. | 380/268 |
| 5,862,367 A | * | 1/1999 | Chiao-Yen | 710/71 |
| 5,978,870 A | * | 11/1999 | Warren | 710/71 |
| 5,991,841 A | | 11/1999 | Gafken et al. | |
| 6,047,343 A | | 4/2000 | Olarig | |
| 6,070,207 A | | 5/2000 | Bell | |
| 6,073,196 A | | 6/2000 | Goodrum et al. | |
| 6,085,278 A | * | 7/2000 | Gates et al. | 710/263 |
| 6,098,132 A | | 8/2000 | Olarig et al. | |
| 6,119,189 A | | 9/2000 | Gafken et al. | |
| 6,128,681 A | * | 10/2000 | Shephard | 710/71 |
| 6,131,127 A | | 10/2000 | Gafken et al. | |
| 6,131,134 A | * | 10/2000 | Huang et al. | 710/302 |
| 6,218,969 B1 | * | 4/2001 | Watson et al. | 341/100 |
| 6,256,687 B1 | * | 7/2001 | Ellis et al. | 710/71 |
| 6,445,313 B2 | * | 9/2002 | Ahn | 341/59 |
| 6,499,070 B1 | * | 12/2002 | Whetsel | 710/71 |
| 6,617,879 B1 | * | 9/2003 | Chung | 326/82 |

* cited by examiner

Primary Examiner—Xuan M. Thai
Assistant Examiner—Justin King
(74) Attorney, Agent, or Firm—Schwegman, Lundberg, Woessner & Kluth, P.A.

(57) ABSTRACT

A method and apparatus are provided for operating a hot plug system. A first device may determine whether the system is to operate in one of a parallel mode or a serial mode. A second device may control a mode of the chipset based on the determination of the first device. The second device may include logic, a first multiplexer, a second multiplexer, a first converter and a second converter all provided on the chipset.

7 Claims, 4 Drawing Sheets

APPARATUS AND METHOD FOR PARALLEL AND SERIAL PCI HOT PLUG SIGNALS

FIELD

The present invention is directed to PCI hot plug signals. More particularly, the present invention is directed to multiplexing parallel mode PCI hot plug signals and serial mode PCI hot plug signals.

BACKGROUND

As a particular computer's usage and applications expand, it may be desirable to expand the input/output (I/O) capabilities of that computer. A computer system typically includes a memory controller and an I/O controller. The memory controller may interface a fixed amount of memory to the host bus, and the I/O controller may interface a fixed number of I/O buses to the host bus. For example, a PCI-to-host bridge may interface a Peripheral Component Interconnect (PCI) bus to the host bus. A PdI bus is a high performance, high bandwidth bus configured in accordance with protocols established by the PCI Special Interest Group. The PCI-to-host bridge is provided, in part, to facilitate conversion of data from the PCI format to a format employed by the host bus.

Many existing computer systems include I/O devices such as PCI compatible devices or PCI expansion cards that can be connected to one of several PCI expansion slots. In computer systems utilizing a PCI bus, PCI expansion cards can be unplugged from and plugged into PCI expansion slots while the computer system is powered and running. This is called hot plugging. The ability to hot plug PCI cards and adapters is desirable because PCI expansion cards can be replaced without having to power down the computer system.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto.

The following represents brief descriptions of the drawings in which like reference numerals represent like elements and wherein.

DETAILED DESCRIPTION

Figure 1:
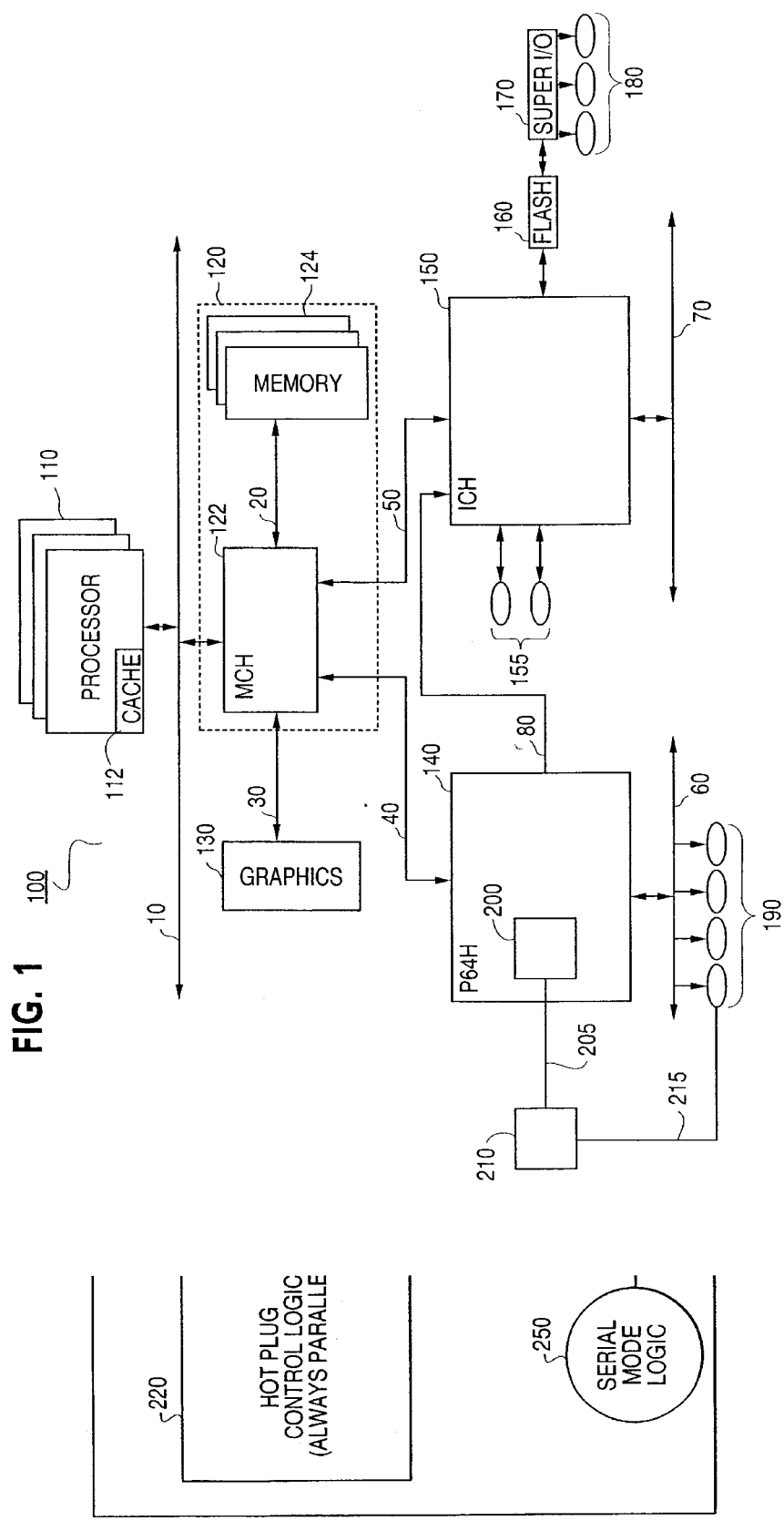
FIG. 1 is a computer system platform according to an example embodiment of the present invention.

In the following discussion, like reference numerals and characters may be used to designate identical, corresponding or similar components in differing figure drawings. Further, in the detailed description to follow, example sizes/models/values/ranges may be given although the present invention is not limited to the same. Arrangements may be shown in block diagram form in order to avoid obscuring the invention, and also in view of the fact that specifics with respect to implementation of such block diagram arrangements may be highly dependent upon the platform within which the present invention is to be implemented. That is, such specifics should be well within the purview of one skilled in the art. Where specific details (e.g., circuits, flowcharts) are set forth in order to describe example embodiments of the invention, it should be appreciated to one skilled in the art that the invention can be practiced without, or with variation of, these specific details. Finally, it should be appreciated that differing combinations of hard-wired circuitry and software instructions may be used to implement embodiments of the present invention. That is, the present invention is not limited to any specific combination of hardware and software.

Embodiments of the present invention may also be described with respect to a signal line, a plurality of signal lines, a signal and a plurality of signals. These terminologies are intended to be interchangeable. That is, an embodiment may be described with respect to a signal line that couples two components. This embodiment likewise includes plural signal lines to couple the two components.

Additionally, any reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

FIG. 1 shows an example computer system platform according to an example embodiment of the present invention. Other embodiments and configurations are also within the scope of the present invention. As shown in FIG. 1, the computer system 100 may include a processor subsystem 110, a memory subsystem 120 coupled to the processor subsystem 110 by a front side bus 10, graphics 130 coupled to the memory subsystem 120 by a graphics bus 30, one or more host chipsets 140–150 coupled to the memory subsystem 120 by hub links 40 and 50 for providing an interface with peripheral buses such as Peripheral Component Interconnect (PCI) buses 60 and 70 of different bandwidths and operating speeds, a flash memory 160, and a super I/O 170 coupled to the chipset 150 by a low pin count (LPC) bus for providing an interface with a plurality of I/O devices 180 such as a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices. A plurality of I/O devices 190 may be provided along the non-legacy PCI bus 60. The computer system 100 may be configured differently or employ some or different components than those shown in FIG. 1.

The processor subsystem 110 may include a plurality of host processors and a cache subsystem 112. The memory subsystem 120 may include a memory controller hub (MCH) 122 coupled to the host processors by the front side bus 10 (i.e., host or processor bus) and at least one memory element 124 coupled to the MCH 122 by a memory bus 20. The memory element 124 may be a dynamic random-access-memory (DRAM), or may be a read-only-memory (ROM), video random-access-memory (VRAM) and the like. The memory element 124 stores information and instructions for use by the host processors. The graphics 130 may be coupled to the main controller hub 122 of the memory subsystem 120 by the graphics bus 30, and may include, for example, a graphics controller, a local memory and a display device (e.g., cathode ray tube, liquid crystal display, flat panel display, etc.).

The host chipsets (labeled 140 and 150) may be similar to Peripheral Component Interconnect (PCI) bridges (e.g., host, PCI-PCI, or standard expansion bridges) in the form of PCI chips such as, for example, the PIIX4® chip and PIIX6® chip manufactured by Intel Corporation. In particular, the chipsets (labeled 140 and 150) may correspond to a Peripheral Component Interconnect (PCI) 64-bit hub (P64H or P64H2) and an input/output controller hub (ICH 150). Embodiments of the present invention may include a control unit 200 (also called a control mechanism) as part of the chipset or P64H2 140. As shown in FIG. 1, the control unit 200 may be coupled to an external hot plug controller deserializer 210 by signal lines 205. The external hot plug controller deserializer 210 may be further coupled to the devices 190 by the signal lines 215.

The P64H2 140 and the ICH 150 may be coupled to the MCH 122 of the memory subsystem 120 respectively by 16 bits and 8 bits hub links 40 and 50, for example, and may operate as an interface between the front side bus 10 and the peripheral buses 60 and 70 such as PCI buses of different bandwidths and operating speeds. The PCI buses may be high performance 32 or 64 bit synchronous buses with automatic configurability and multiplexed address, control and data lines as described in the latest version of "PCI Local Bus Specification, Revision 2.2" set forth by the PCI Special Interest Group (SIG) on Dec. 18, 1998 for add-on arrangements (e.g., expansion cards) with new video, networking, or disk memory storage capabilities. For example, the PCI bus 60 of 64-bits and 66 MHz may connect to the P64H2 140. Similarly, the PCI bus 70 of 32-bits and 33 MHz may connect to the ICH 150. Other types of bus architectures such as Industry Standard Architecture (ISA) and Expanded Industry Standard Architecture (EISA) buses may also be utilized.

The hub links 40 and 50 that couple the P64H2 140 and the ICH 150 to the MCH 122 of the memory subsystem 120 may be primary PCI buses of different bandwidths and operating speeds. The peripheral buses 60 and 70 that connect the P64H2 140 and the ICH 150 to I/O devices may be secondary PCI buses of different bandwidths and operating speeds. The P64H2 140 and ICH 150 may correspond to PCI-PCI bridges designed for compliance with the "PCI Local Bus Specification, Revision 2.2" set forth by the PCI Special Interest Group (SIG) on Dec. 18, 1998, and the "PCI Bus Power Interface (ACPI) and Power Management Interface Specification, Revision 1.1" set forth by the PCI Special Interest Group (SIG) on Jun. 30, 1997.

P64H2 may allow the PCI hot plug to be configured at power up as either a parallel hot plug system or a serial hot plug system based on input strap signals. For example, if there are three to six hot plug slots (represented by the devices 190 in FIG. 1), then the P64H2 140 may power up in the serial mode. On the other hand, if there are one or two slots, the P64H2 140 may power up in the parallel mode. In the parallel mode, several of the hot plug serial-mode pins and advanced programmable interrupt controller (APIC) interrupt pins may change their function to parallel mode hot plug control signals. By multiplexing the pins, the overall pin count may be lower than with two interfaces (one for parallel and one for serial).

Figure 2:
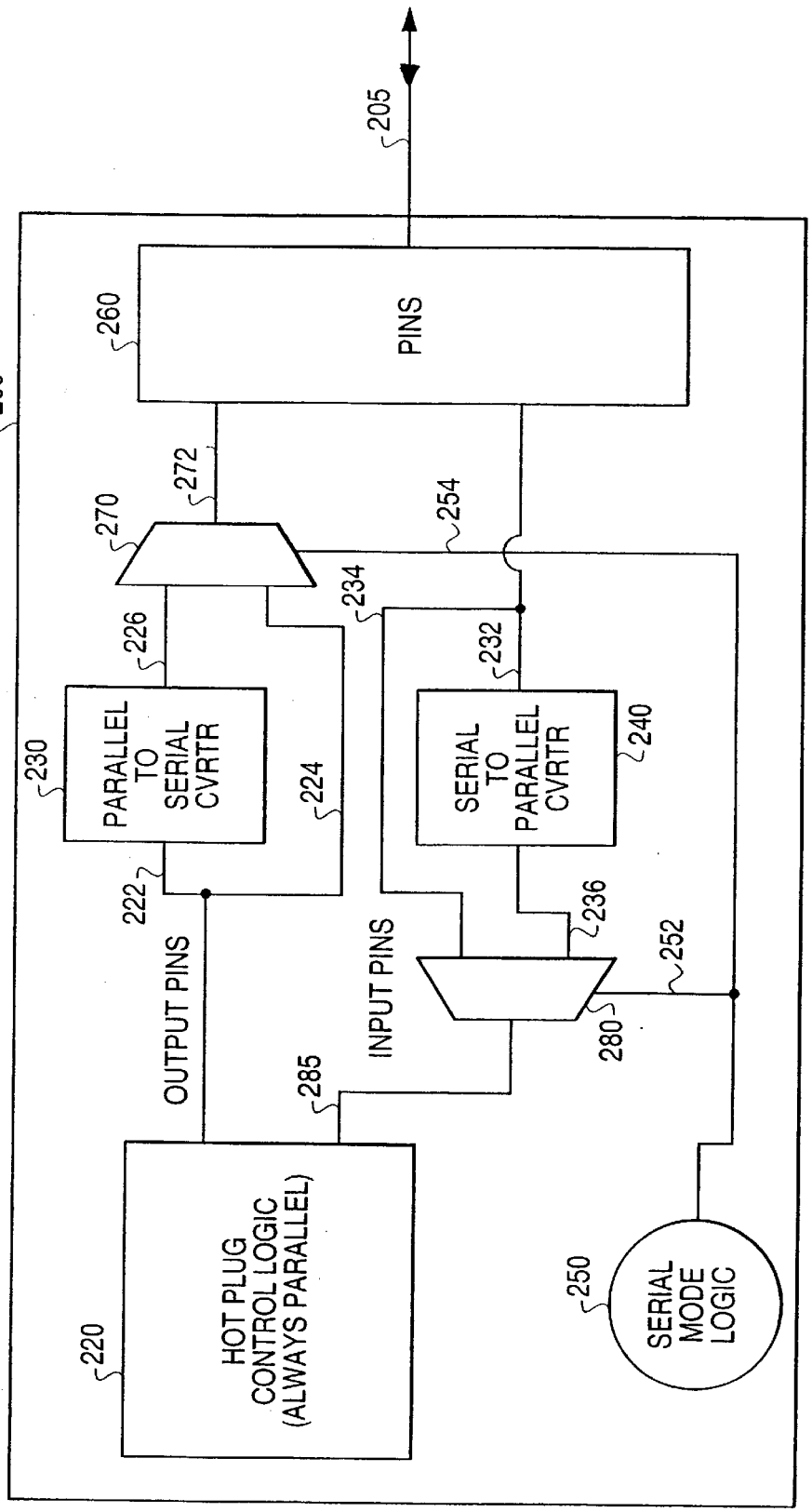
FIG. 2 illustrates a control unit for multiplexing of parallel mode signals and serial mode signals according to an example embodiment of the present invention.

FIG. 2 illustrates the control unit 200 according to an example embodiment of the present invention. Other configurations and embodiments of the control unit 200 are also within the scope of the present invention. In accordance with embodiments of the present invention, the control unit 200 is capable of multiplexing serial mode hot plug signals and parallel mode hot plug signals. More specifically, the control unit 200 includes hot plug control logic 220, a parallel to serial converter 230, a serial to parallel converter 240, serial mode logic 250, a multiplexer 270 and a multiplexer 280. Signals may be input and output along pins 260 that may be coupled to signal lines 205. The pins 260 may correspond to a hot plug bus (or series of pins). For ease of illustration, FIG. 2 only shows a single signal line 205 although each of the pins 260 may be coupled to a separate signal line output from the control unit 200.

The pins 260 may be coupled to an input of a serial to parallel converter 240 by a signal line 232. The serial to parallel converter 240 performs a serial to parallel conversion and outputs signals along a signal line 236 to an input of the multiplexer 280. Signal lines 234 may also couple the pins 260 to another input of the multiplexer 280. The multiplexer 280 operates to provide signals along signal lines 285 based on a control signal input along a signal line 252. FIG. 2 only shows a single signal line 285 although a plurality of signal lines may be coupled between the multiplexer 280 and the hot plug control logic 220.

The hot plug control logic 220 may provide signals along a signal line 222 to an input of the parallel to serial converter 230. The parallel to serial converter 230 performs a parallel to serial conversion and outputs signals along a signal line 226 to an input of the multiplexer 270. The hot plug control logic 220 also outputs signals along signal lines 224 to another input of the multiplexer 270. The multiplexer 270 operates to provide signals along a signal line 272 based on a control signal input along a signal line 254. The signals output from the multiplexer 270 along the signal lines 272 are input to the pins 260. Signals on the pins 260 may be output along signal lines 205.

The serial mode logic 250 may operate as a state machine to provide a control signal along the signal line 252 to the multiplexer 280 and to provide a control signal along the signal line 254 to the multiplexer 270. More specifically, the serial mode logic 250 may correspond to a state machine operated by a shift register to provide an output of either a 1 or a 0. The signal of a 1 or 0 may indicate that the control unit 200 is operating in a serial hot plug mode or in a parallel hot plug mode, respectively, or vice versa.

Signals may be input from the pins 260 along the signal lines 232 and 234. If the input signals are in the serial mode, the serial to parallel converter 260 provides parallel output signals along the signal lines 236. In this mode, the control signal output from the serial mode logic 250 along the signal line 252 controls the multiplexer 280 to pass signals corresponding to the signals along the signal lines 236. On the other hand, if the input signals are in the parallel mode, the control signal output from the serial mode logic 250 along the signal line 250 controls the multiplexer 280 to pass signals corresponding to the signals along the signal lines 234.

The hot plug control logic 220 receives signals along the signal lines 285 and outputs signals along the signal lines 222 and 224. The signals along the signal lines 222 may pass thru the parallel to serial converter 230 and pass in serial manner along the signal line 226 to the multiplexer 270. The signals output from the hot plug control logic 220 may pass along the signal line 224 to an input of the multiplexer 270. If operating in the serial mode, the control signal output from the serial mode logic 250 along the signal line 254 controls the multiplexer 270 to pass signals corresponding to the signals on the signal line 224. On the other hand, if operating in the parallel mode, the control signal output from the serial mode logic 250 along the signal line 250 controls the multiplexer 270 to pass signals corresponding to signals along the signal line 226.

In FIG. 2 the hot plug control logic 220 may determine whether slots should be powered or not. That is, the hot plug control logic 220 determines whether the computer system is to operate in either the parallel mode or the serial mode. In accordance with embodiments of the present invention, the hot plug control logic runs in parallel mode. The signals output from the hot plug control logic 220 may be fed either directly to the component pins along the signal line 224 or through a serializer (such as the parallel to serial converter 230) based upon the serial mode logic 250. Similarly, the signals input from the pins 260 may be fed to the hot plug control logic 220 either along the signal line 232 and through the serial to parallel converter 240 or may be fed along the signal lines 234 and 285 to the hot plug control logic 220.

Figure 3:
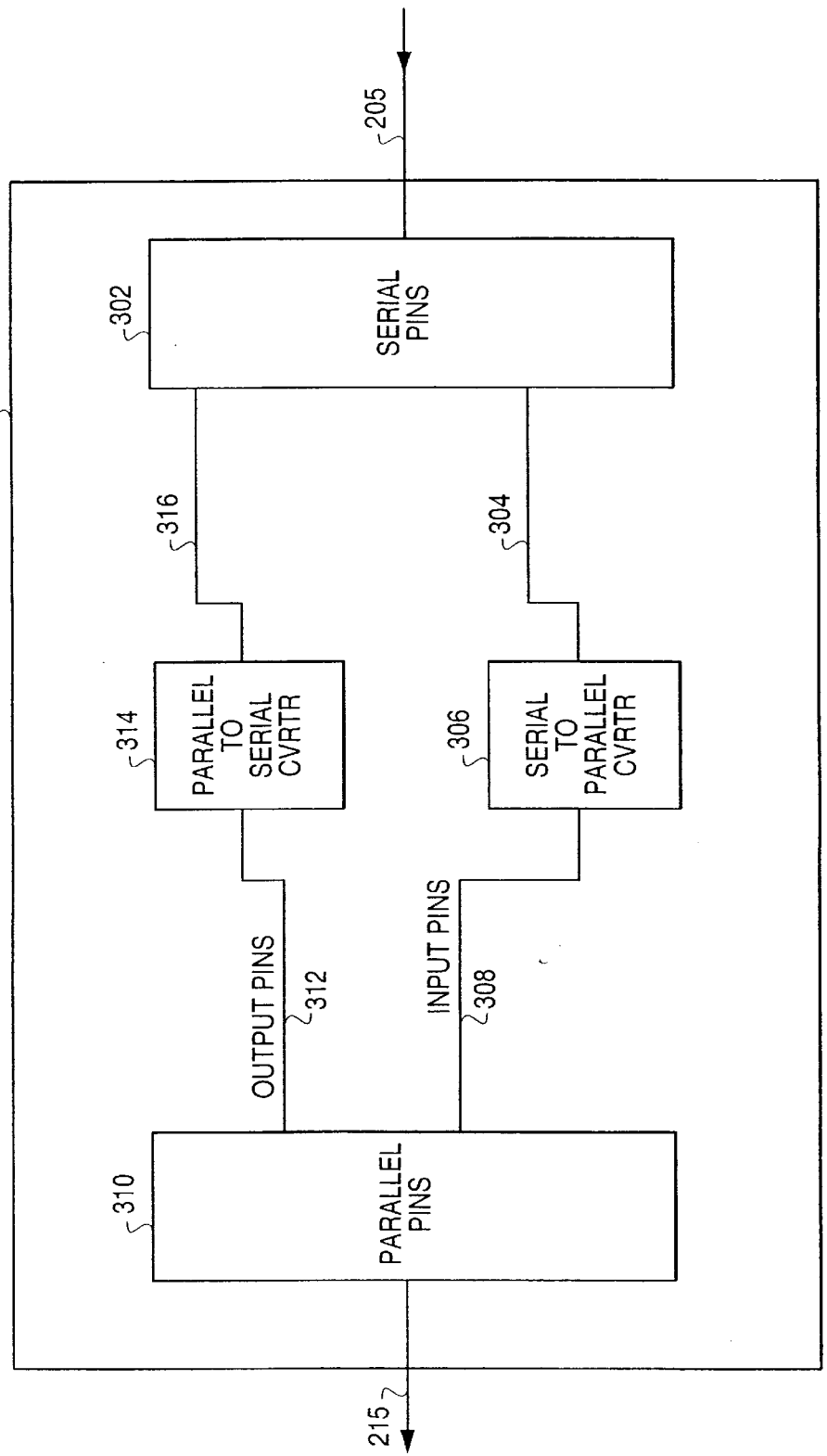
FIG. 3 illustrates an example external hot plug controller deserializer.

FIG. 3 illustrates an external hot plug controller deserializer 210 that may coupled to the control unit 200 by signal lines 205 as shown in FIG. 1. The external hot plug controller deserializer 210 may be used when the system operates in the serial mode. That is, if a system is going to have many slots and needs to hot plug them all, then the system may run in serial mode and include the external hot plug controller deserializer 210 to convert the serial signals into the parallel signals to go to the slots. The pins of the external hot plug controller deserializer 210 may be directly coupled to the pins of the control unit 200 or may be coupled by signal lines as shown. Signals may be input along signal lines 205 (from the control unit 200) to serial pins 302. These signals may pass along a signal line 304 to an input of a serial to parallel converter 306. The serial to parallel converter 306 performs a serial to parallel conversion of the signals and outputs signals along signal lines 308 to parallel pins 310. The parallel pins 310 may be coupled by signal lines 215 (i.e., sideband wires) to any one of the PCI devices 190 as shown in FIG. 1. The sideband wires may carry control signals to power on and off the devices 190. The sideband wires are parallel mode wires or the serial converted parallel wires that are connected to logic next to the slots. The parallel pins 310 may also be coupled by signal lines 312 to a parallel to serial converter 314 that in turn is coupled to serial pins 302 by signal line 316.

Figure 4:
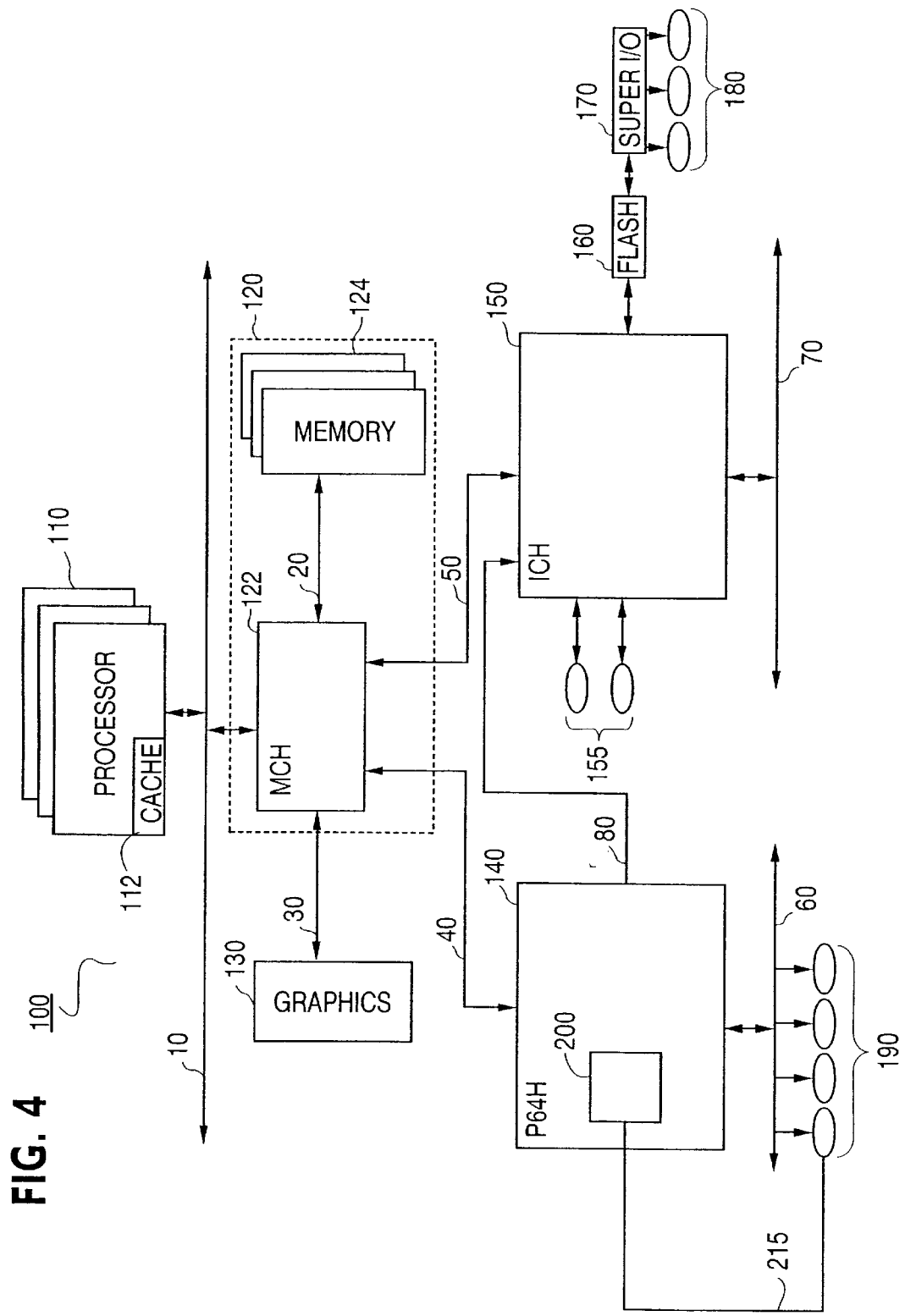
FIG. 4 is a computer system platform according to an example embodiment of the present invention.

The external hot plug controller deserializer 210 may not be used or needed when operating in the parallel mode. FIG. 4 shows an example computer system platform that does not include the external hot plug controller deserializer 210. In the absence of the deserializer 210, signals from the devices 190 pass along the signal lines 215 and connect directly to the signal lines 205.

Embodiments of the present invention may thereby provide a mechanism for operating a hot plug system. The mechanism may include a first device (including a hot plug controller) to determine whether the system is to operate in either a parallel mode or a serial mode. A second device may control a mode of the chipset based on the determination of the first device. The second device may include serial mode logic, a hot plug bus, a first multiplexor, a second multiplexor, a serial to parallel converter, and a parallel to serial converter. The first and second multiplexors may operate based on a control signal output from the serial mode logic that indicates either the parallel mode or the serial mode.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed:

1. A mechanism of a chipset for operating a hot plug system, said mechanism comprising:
   a first device to determine whether said system is to operate in one of a parallel mode and a serial mode;
   a hot plug bus to receive signals in one of said parallel mode and said serial mode; and
   a second device to control the mode of said chipset based on said determination of said first device, said second device comprising
      logic to control operations based on said determination of said first device,
      a first multiplexor to receive signals from said hot plug bus and a second multiplexor to output signals to said hot plug bus, said first multiplexer and said second multiplexer to operate based on a control signal output from said logic indicating one of said parallel mode and said serial mode; and
      a first converter cooled between said hot plug bus and said first multiplexer to convert serial signals to parallel signals, and a second converter coupled between a hot plug controller and said second multiplexer to convert parallel signals to serial signals.

2. The mechanism of claim 1, wherein said first device comprises a hot plug controller provided on said chipset.

3. The mechanism of claim 1, wherein said chipset corresponds to a Peripheral Component Interconnect (PCI) 64-bit hub.

4. A hot plug computer system comprising:
   a processor;
   a memory controller to couple to said processor; and
   a chipset to couple to said memory controller and to provide an interface with a peripheral bus, said chipset further including a control mechanism to operate in one of a serial mode and a parallel mode, said control mechanism comprising:
      a first device to determine whether said system is to operate in one of a parallel mode and a serial mode;
      a hot plug bus to receive signals in one of said parallel mode and said serial mode; and
      a second device to control the mode of said chipset based on said determination of said first device, said second device comprising
         logic to control operations based on said determination of said first device, a first multiplexor to receive signals from said hot plug bus and a second multiplexor to output signals to said hot plug bus, said first multiplexer and said second multiplexer to operate based on a control signal output from said logic indicating one of said parallel mode and said serial mode, and a first converter coupled between said hot plug bus and said first multiplexer to convert serial signals to parallel signals, and a second converter coupled between a hot plug controller and said second multiplexer to convert parallel signals to serial signals.

5. The computer system of claim 4, wherein said first device comprises a hot plug controller provided on said chipset.

6. The computer system of claim 4, wherein said chipset corresponds to a Peripheral Component Interconnect (PCI) 64-bit hub.

7. The computer system of claim 4, further comprising an external hot plug controller deserializer to couple between said control mechanism and at least one device on said peripheral bus.

* * * * *

UNITED STATES PATENT AND TRADEMARK OFFICE
CERTIFICATE OF CORRECTION

PATENT NO. : 6,792,494 B2
DATED : September 14, 2004
INVENTOR(S) : Bennett et al.

It is certified that error appears in the above-identified patent and that said Letters Patent is hereby corrected as shown below:

<u>Title page, Item [54] and Column 1, line 1,</u>
Title, after "FOR" insert -- CONVERTING --.

<u>Column 6,</u>
Line 40, delete ";" and insert -- , --, therefor.
Line 41, delete "cooled" and insert -- coupled --, therefor.

Signed and Sealed this

Twenty-eighth Day of December, 2004

JON W. DUDAS
*Director of the United States Patent and Trademark Office*